(12) United States Patent
Taguchi et al.

(10) Patent No.: US 8,477,022 B2
(45) Date of Patent: Jul. 2, 2013

(54) VEHICULAR DISPLAY APPARATUS

(75) Inventors: Takeshi Taguchi, Saitama (JP); Satoshi Aoyagi, Utsunomiya (JP); Yukiko Yamamoto, Utsunomiya (JP); Shinji Kamon, Utsunomiya (JP); Yozo Takagi, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 252 days.

(21) Appl. No.: 12/742,077

(22) PCT Filed: Nov. 6, 2008

(86) PCT No.: PCT/JP2008/070221
§ 371 (c)(1),
(2), (4) Date: May 7, 2010

(87) PCT Pub. No.: WO2009/060904
PCT Pub. Date: May 14, 2009

(65) Prior Publication Data
US 2010/0277495 A1    Nov. 4, 2010

(30) Foreign Application Priority Data
Nov. 8, 2007  (JP) ................. P2007-291274

(51) Int. Cl.
*B60Q 1/00*    (2006.01)
(52) U.S. Cl.
USPC ................ 340/439; 340/438; 345/440
(58) Field of Classification Search
None
See application file for complete search history.

(56) References Cited

U.S. PATENT DOCUMENTS

| | | | |
|---|---|---|---|
| RE39,856 E | * | 9/2007 | Ruthenberg ............ 315/185 R |
| 7,474,309 B2 | * | 1/2009 | Kolpasky et al. ............ 345/440 |
| 2002/0133288 A1 | * | 9/2002 | Minami et al. ............. 701/114 |
| 2003/0006987 A1 | * | 1/2003 | Ericsson et al. ............ 345/440 |
| 2003/0164771 A1 | * | 9/2003 | Dove et al. ............ 340/679 |
| 2007/0026276 A1 | * | 2/2007 | Ogawa et al. ............ 429/22 |
| 2008/0258892 A1 | * | 10/2008 | Itoh et al. ............ 340/441 |

FOREIGN PATENT DOCUMENTS

| | | |
|---|---|---|
| JP | 2961660 B1 | 10/1999 |
| JP | 2000-046587 A | 2/2000 |
| JP | 2004-153958 A | 5/2004 |
| JP | 2005-9381 A | 1/2005 |
| JP | 2006-184222 A | 7/2006 |
| JP | 2006-321364 A | 11/2006 |
| JP | 2007-253864 A | 10/2007 |
| JP | 2007-538227 A | 12/2007 |
| WO | WO-2005/120881 A1 | 12/2005 |

OTHER PUBLICATIONS

Machine Translation for Japanese Publication No. JP-2007-253864.*
Notice of Reasons for Rejection issued Feb. 5, 2013, in counterpart Japanese Patent Application No. 2011-214321 (4 pages including English translation).

* cited by examiner

*Primary Examiner* — Kee M Tung
*Assistant Examiner* — Ryan D McCulley
(74) *Attorney, Agent, or Firm* — Arent Fox LLP

(57) ABSTRACT

A vehicular display apparatus of the invention includes a display portion that displays a predetermined graphic in accordance with a present consumption amount of energy used for moving a vehicle. The graphic displayed on the display portion changes at least one of a displayed size and a displayed color thereof in accordance with the consumption amount. The displayed size increases as the consumption amount increases. The displayed color is changed to have a longer wavelength of color as the consumption amount increases.

8 Claims, 8 Drawing Sheets

VEHICULAR DISPLAY APPARATUS

TECHNICAL FIELD

The present invention relates to a vehicular display apparatus that displays a present consumption state of running energy of a vehicle.

Priority is claimed on Japanese Patent Application No. 2007-291274, filed on Nov. 8, 2007, the contents of which are incorporated herein by reference.

BACKGROUND ART

As a display apparatus arranged in an instrument panel or the like of a vehicle, there is devised one that displays information, such as average mileage within a predetermined distance and travelable distance based on a remaining amount of fuel, in a readout size in accordance with the traveling speed of a vehicle, thus improving the visibility at the time of traveling at high speed (for example, see Patent Document 1).

Patent Document 1: Japanese Unexamined Patent Application, First Publication No. 2006-184222

In this conventional vehicular display apparatus, the displayed readout is enlarged in accordance with the traveling speed in order to improve visibility while traveling. However, the displayed information is mainly in numerals. Therefore, it is not possible to grasp the information without looking at the displayed information.

Furthermore, in recent years, it is desired that the present consumption amount of running energy of a vehicle be displayed on a display console, to thereby encourage the driver to be conscious of energy-saving driving.

DISCLOSURE OF INVENTION

Therefore, it is an object of this invention to provide a vehicular display apparatus that allows the present consumption amount of running energy to be grasped instantaneously without arousing a feeling of discomfort, to thereby encourage the driver to be conscious of energy-saving driving.

To solve the aforementioned problem and achieve such an object, the present invention adopts the followings.

(1) A vehicular display apparatus according to the present invention includes a display portion that displays a predetermined graphic in accordance with a present consumption amount of energy used for moving a vehicle, in which the graphic displayed on the display portion changes at least one of a displayed size and a displayed color thereof in accordance with the consumption amount, in which the displayed size increases as the consumption amount increases, and in which the displayed color is changed to have a longer wavelength as the consumption amount increases. The vehicular display apparatus further include a display control portion that outputs an indication value in accordance with a detected value of the consumption amount to the display portion, and that the display control portion controls an output of the indication value so that the ratio of a change in the indication value with respective to a change in increase/decrease in the detected value is milder as the detected value of the consumption amount increase.

According to the vehicular display apparatus as set forth in the above (1), the present consumption amount of energy is intuitively grasped by the driver through a change in at least one of the displayed size and the displayed color of the graphic displayed on the display portion. To be more specific, for example in a commonly used region from a zero consumption amount of energy to a preset consumption amount of energy, the display control portion regulate the indication value output such that the ratio of change in the indication value to the change in the detected value is increased. In a rarely used region in which the consumption amount of energy is above the preset consumption of energy, the display control portion regulate the indication value output such that the ratio of the change in the indication value to the change in the detected value is decreased. Consequently, in the commonly used region, the graphic of the display portion sensitively changes in a displayed size and a displayed color. In the region above the commonly used region, the graphic gradually changes in displayed size and displayed color.

(2) It is preferable that the vehicular display apparatus further includes a display control portion that outputs an indication value in accordance with a detected value of the consumption amount to the display portion, and that the indication value which the display control portion outputs to the display portion be a value resulting from delay processing being performed on a value corresponding to the detected value.

In the case of the above (2), even if the detected value of the consumption amount is instantaneously increased/decreased, the indication value for the display portion will not vary too sensitively as a result of following the increase/decrease in the detected value.

(3) It is preferable that, when the consumption amount is not more than a predetermined value in a vicinity of zero, the display portion display a graphic with a predetermined size in which the displayed size is not zero.

(4) It is preferable that, while the vehicle is in an idle stop state, the display portion displays a second graphic having a size and a color which are different from those of the first graphic that change in accordance with the consumption amount.

In the above (4), a difference between a state of idle stop and other states are visibly made clear.

(5) is preferable that the graphic be circular, and that a substantially hemispheric lens that transmits light for forming the graphic be arranged in the display portion.

(6) In the case of the above (5), it is preferable that lattice-shaped grooves be provided in a surface of the substantially hemispheric lens.

(7) It is preferable that the vehicle use, as a drive electric power source, a fuel cell that consumes hydrogen as the energy to generate electric power, and that a consumption amount of the energy be obtained based on a generated current of the fuel cell.

In the case of the above (7), for example, a hydrogen consumption for purge processing of the fuel cell or the like ceases to be reflected on the displayed graphic of the display portion, and only an energy consumption contributing to vehicle movement comes to be reflected on the graphic display.

ADVANTAGEOUS EFFECT OF THE INVENTION

According to the above (1) of the invention, a change in at least one of the displayed size and the displayed color of the graphic which is displayed on the display portion allows the driver to instantaneously grasp the present consumption amount of energy in an intuitive manner. This makes it possible to encourage the driver to be conscious of energy-saving driving.

Moreover, according to the above (1) of the invention, the output of the indication value is controlled so that the greater the detected value of the consumption amount is, the lower the ratio of the change in the indication value to the change in increase/decrease in the detected value. Therefore, a change in displayed graphic in the commonly used region with respect to a change in an instantaneous consumption amount of energy can be made sensitive, and the change in displayed graphic with respect to the change in an instantaneous consumption amount of energy can be made milder as the region is further away from the commonly used region. This highly-sensitively notifies the driver of a change in an instantaneous consumption amount of energy in the commonly used region, to thereby make it possible to encourage the driver to be more conscious of energy-saving driving.

In the case of the above (2), the value resulting from delay processing being performed on a value corresponding to the detected value is treated as an indication value that is output to the display portion. Therefore, it is possible to suppress too sensitive a change in displayed graphic on the display portion in response to an instantaneous increase/decrease in the detected value, to thereby further lessen a feeling of discomfort received by the driver.

In the case of the above (3), when the instantaneous consumption amount of energy is not more than a predetermined value in the vicinity of zero, a graphic with a predetermined size in which the displayed size is not zero is displayed. Therefore, when energy is cut during deceleration of the vehicle and in other times, discontinuity of the displayed graphic is avoided, and making it possible to lessen a feeling discomfort of the driver.

In the case of the above (4), while the vehicle is in an idle stop state, the display portion displays a second graphic having a size and a color which are different from those of the first graphic that change in accordance with the consumption amount. This allows the driver to visually recognize clearly whether the vehicle is in a state of idle stop or not, to thereby make it possible to notify the driver that the vehicle is in a driving condition even in a silent state when the idle stop mode is active.

In the case of the above (5), a displayed graphics circular and the substantially hemispheric lens transmitting the light that forms the graphic on the display portion is arranged. Therefore, it is possible to allow the driver to visually recognize the displayed graphic while offering a further three-dimensional effect.

In the case of the above (6), the lattice-shaped grooves are provided in the substantially hemispheric surface of the lens. Therefore, it is possible to allow the driver to visually recognize a three-dimensional sphere irrespective of the curvature of the lens.

In the case of the above (7), the instantaneous consumption amount of energy is obtained based on the generated current of the fuel cell. Therefore, only consumption of the energy contributing to vehicle movement and the like is reflected in a change in the graphic, to thereby make it possible to encourage the driver to be more conscious of energy consumption.

BRIEF DESCRIPTION OF THE DRAWINGS

In FIG. 5, reference character a denotes a region used during electric power generation, and reference character denotes a region for a fade-out when entering into an idle stop mode.

DESCRIPTION OF THE REFERENCE SYMBOLS

Figure 1:
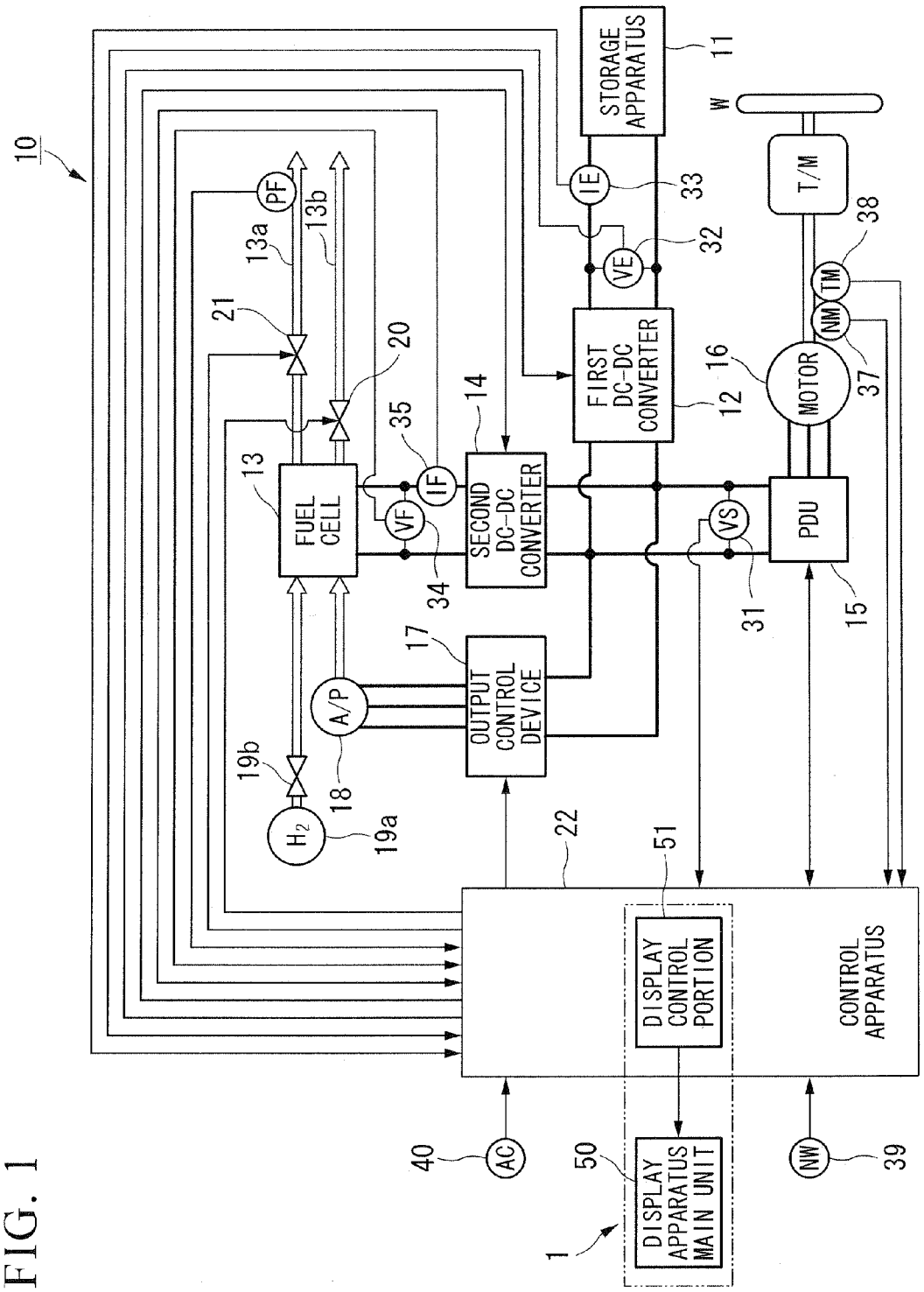
FIG. 1 is a schematic block diagram of a fuel cell vehicle that adopts a vehicular display apparatus according to one embodiment of the present invention.

1: vehicular display apparatus
13: fuel cell
51: display control portion
55: energy consumption display portion (display portion)
59: lens
60: groove

BEST MODE FOR CARRYING OUT THE INVENTION

Hereunder is a description of one embodiment of this invention based on the drawings.

This embodiment is for the case where the present invention is applied to a vehicular display apparatus 1 that displays an amount of instantaneous energy consumption of a fuel cell vehicle 10.

FIG. 1 shows a schematic block diagram of the fuel cell vehicle 10 to which the vehicular display apparatus 1 is applied. In FIG. 1, reference numeral 11 denotes a storage apparatus such as a capacitor or a battery. Reference numeral 13 denotes a fuel cell. Reference numeral 16 denotes a motor for driving a vehicle and regenerating electric power.

In the motor 16, there is provided a PDU (power drive unit) 15 for controlling a drive operation and an electric power regeneration operation. To the PDU 15, there are connected electrode portions of the storage apparatus 11 via a first DC-DC converter 12, and there are also connected electrode portions of the fuel cell 13 via a second DC-DC converter 14. The storage apparatus 11 and the fuel cell 13 are connected to each other via the first DC-DC converter 12 and the second DC-DC converter 14.

The first DC-DC converter 12 and the second DC-DC converter 14 are each provided with a bidirectional chopper-type power converter circuit. They each appropriately control a duty ratio through an on/off operation of a switching element in the circuit to increase and decrease voltage. The converters 12, 14 and the PDU 15 are appropriately controlled by a control apparatus 22 in accordance with an operational condition of the vehicle.

For example, when the vehicle is normally traveling, a direct current generated by the fuel cell 13, after being converted to a three-phase alternating current by the PDU 15, is supplied to the motor 16. As required, the electric power generated by the fuel cell 13 is decreased in voltage by the first DC-DC converter 12, and is then charged into the storage apparatus 11. When the vehicle is decelerated or the like, the three-phase alternating current generated by the motor 16 is converted to a direct current by the PDU 15. The direct current is decreased in voltage by the first DC-DC converter 12, and is then charged into the storage apparatus 11. In some traveling conditions, the electric power of the storage apparatus 11, after being increased in voltage by the first DC-DC converter 12, is supplied to the motor 16 via the PDU 15.

In FIG. 1, reference numerals 32, 33 denote a voltage sensor (VE) and a current sensor (IE) for detecting a terminal voltage VE and a charging current IE of the storage apparatus 11, respectively. Reference numerals 34, 35 denote a voltage sensor (VF) and a current sensor (IF) for detecting an output voltage VF and an output current IF of the fuel cell 13, respectively. Reference numeral 31 denotes a voltage sensor (VS) for detecting a system voltage VS between the PDU 15 and the DC-DC converters 12, 14. The sensors 31 to 35 are connected to the inputs of the control apparatus 22 for controlling the respective portions of the fuel cell 13, and the PDU 15, the DC-DC converters 12, 14, and the like.

In the fuel cell 13, air, which is an oxidant gas including oxygen, is supplied from an air supply apparatus (A/P) 18 such as an air compressor to a cathode (not shown in the figure). A fuel gas including hydrogen is supplied from, for example, a high-pressure hydrogen tank 19a to an anode (not shown in the figure) via a hydrogen supply valve 19b.

At the anode of the fuel cell 13, hydrogen is ionized through catalysis. The hydrogen ions move to the cathode via a solid polymer electrolyte film which is moderately humidified. At this time, electrons generated with the movement of the hydrogen ions are extracted into an external circuit and are utilized as direct-current electric energy. At this time, at the cathode, hydrogen ions react with electrons and oxygen to produce water.

The air supply apparatus 18 is driven by a motor (not shown in the figure). The motor is controlled via an output control device 17.

An unreacted exhaust gas having been exhausted from a hydrogen exhaust port 13a of the fuel cell 13 is introduced into a dilution box (not shown in the figure) via an exhaust control valve (not shown in the figure) whose opening/closing is controlled by the control apparatus 22. The unreacted exhaust gas, after being diluted to a hydrogen concentration not more than a predetermined concentration in the dilution box, is exhausted outside the system via a purge valve 21.

Furthermore, a part of the unreacted exhaust gas having been exhausted from the hydrogen exhaust port 13a of the fuel cell 13 is introduced into, for example, a circulation passage (not shown in the figure) provided with a circulation pump (not shown in the figure) and an ejector (not shown in the figure). There, the hydrogen having been supplied from the hydrogen tank 19a is mixed with the exhaust gas having been exhausted from the fuel cell 13 to be supplied again to the fuel cell 13.

On the other hand, the unreacted gas having been exhausted from an air exhaust port 13b of the fuel cell 13 is exhausted outside the system via a back-pressure regulating valve 20 whose degree of opening is controlled by the control apparatus 22.

To the inputs of the control apparatus 22, there are connected, in addition to the aforementioned sensors 31 to 35, a rotation sensor (NM) 37 and a torque sensor (TM) 38 respectively for detecting the number of rotations and the torque of the motor 16, and there are also connected a wheel speed sensor (NW) 39 for detecting the rotational speed of the wheels, and an accelerator opening degree sensor (AC) 40 for detecting an amount of operation on the accelerator pedal by the driver.

In addition to controlling the respective portions of the fuel cell 13, and the PDU 15 and the DC-DC converters 12, 14 as described above, the control apparatus 22 calculates an indication value that corresponds to a present, instantaneous consumption amount of energy, and outputs the calculated indication value to a display apparatus main unit 50 (described later) of the vehicular display apparatus 1. In this embodiment, a present, instantaneous consumption amount of energy is grasped through the generated current IF of the fuel cell 13. Thereby, of the instantaneous consumption amount of hydrogen as an energy source, a consumption portion that is exhausted in a purge process or the like without being effectively utilized as energy can be excluded. To be more specific, the control apparatus 22 includes a display control portion 51 for calculating an indication value based on a detected value of the generated current IF of the fuel cell 13 detected by the current sensor 35, and outputting the indication value to the display apparatus main unit 50. Specific processing in the display control portion 51 will be described in detail later.

In this embodiment, the vehicular display apparatus 1 includes: the display apparatus main unit 50 that is arranged in the instrument panel (not shown in the figure); and the display control portion 51 that outputs an indication value to the display apparatus main unit 50 based on the detected value by the current sensor 35.

Figure 2:
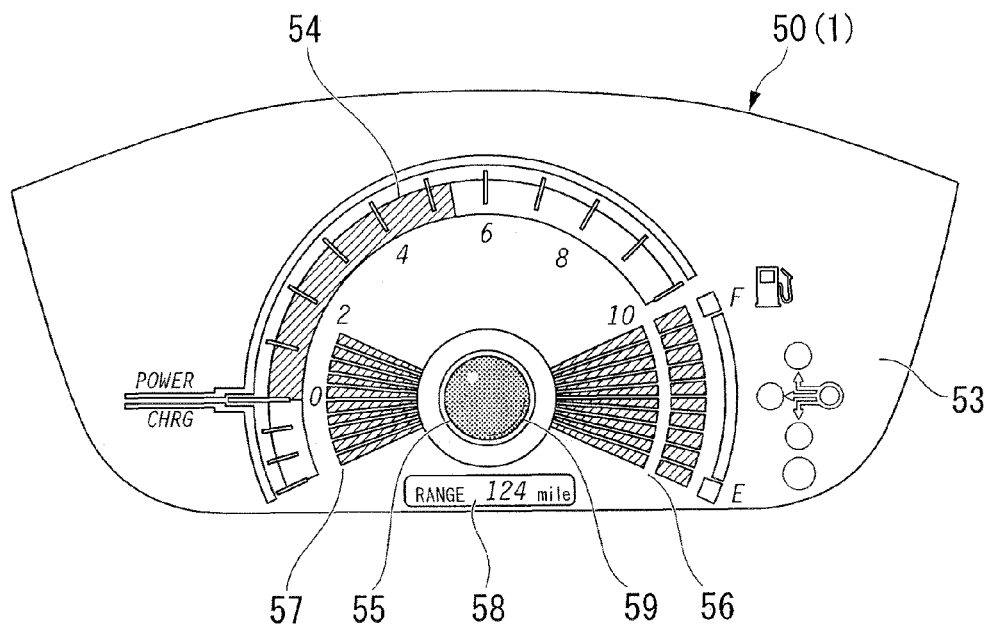
FIG. 2 is a front view of the vehicular display apparatus of the embodiment.
Figure 3:
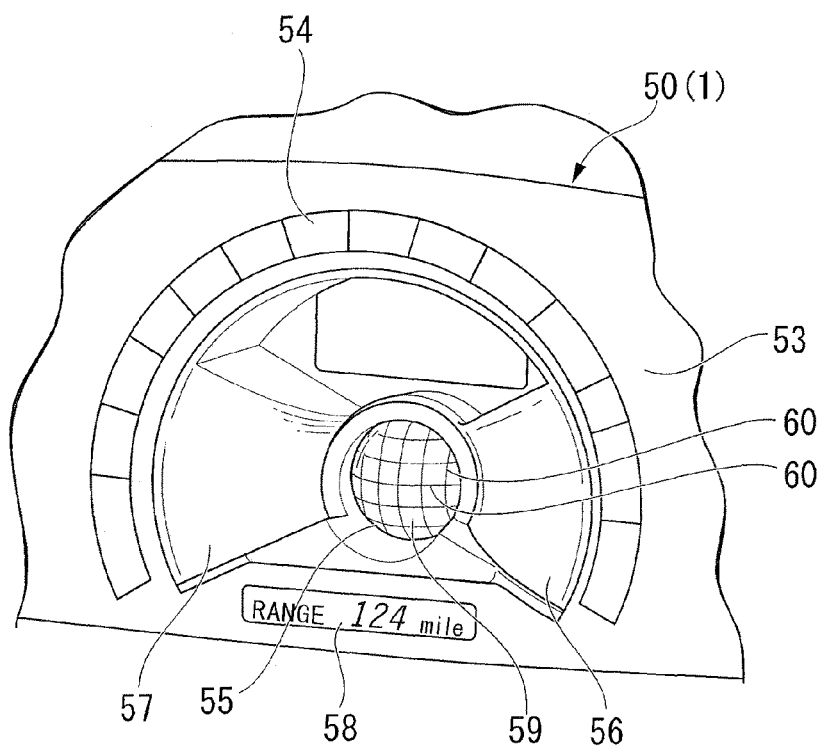
FIG. 3 is a perspective view of the vehicular display apparatus of the embodiment.

As shown in FIG. 2 and FIG. 3, in the display apparatus main unit 50, an arcuate drive/regeneration display portion 54 that displays a drive output and a regenerated electric power of the motor 16 is arranged in a display console 53 made of an acrylic resin. In addition, at the central portion of the drive/regeneration display portion 54, there is arranged a circular energy consumption display portion 55 (display portion) that displays a present, instantaneous consumption amount of energy. Furthermore, on the right side (seen from front) of a fan-shaped space between the drive/regeneration display portion 54 and the energy consumption display portion 55, there is arranged a remaining hydrogen display portion 56 that displays the remaining amount of hydrogen in the hydrogen tank 19a. Similarly, on the left side (seen from front) of the fan-shaped space, there is arranged a remaining power display portion 57 that displays a state of charge (SOC) of the storage apparatus 11. At a position on the inner side of the drive/regeneration display portion 54 and directly below the energy consumption display portion 55, there is arranged a speed display portion 58 that digitally displays the present vehicle speed in numerals.

The whole display console 53 of the display apparatus main unit 50 is not a plate-like one, but a cubic one with protrusions and recesses in its depth direction. To be more specific, as shown in FIG. 3, the drive/regeneration display portion 54 and the speed display portion 58 are formed on the same oblate surface. The energy consumption display portion 55 arranged at the center of the arc of the drive/regeneration display portion 54 is arranged in a manner recessed in the depth direction with respect to the oblate surface on which the drive/regeneration display portion 54 and the speed display portion 58 are arranged. The remaining hydrogen display portion 56 and the remaining power display portion 57 are arranged within a tapered surface that connects the energy consumption display portion 55 with the drive/regeneration display portion 54.

By liquid crystal, the drive/regeneration display portion 54 optically opens and closes light transmittance of backlight (not shown in the figure), such as an LED (Light Emitting Diode), at an appropriate time. Thereby, with light in a circular bar graph along an arcuate display scale being lit, a value showing a drive state or a regeneration state of the motor 16 is indicated. The remaining hydrogen display portion 56 and the remaining power display portion 57 indicate an amount of remaining hydrogen and an amount of remaining power, respectively, in the substantially the same mechanism as the drive/regeneration display portion 54. In each of them, unit scale marks that are lit by the irradiation of backlight are formed long in a radial direction, and a circular bar graph that indicates the remaining amount is shaped in a fan. The displayed colors of the drive/regeneration display portion 54, the remaining hydrogen display portion 56, and the remaining power display portion 57 are appropriately made different from one another for improved visibility.

The energy consumption display portion 55 is capable of selectively displaying a plurality of circular graphics same in central position and different in size (area) and color by means of a liquid crystal panel (not shown in the figure) provided with a color filter. At the front position of the liquid crystal panel on the display console 53, there is arranged a substantially hemispheric lens 59 as shown in FIG. 3. The lens 59 is for allowing the driver to three-dimensionally recognize the circular graphics displayed by the liquid crystal panel. On the surface thereof, there are provided a plurality of grooves 60 with a wedge-like cross-section, which are arranged in a lattice-shape. The lattice-shaped grooves 60 are provided for the visual recognizer to have a more three-dimensional impression. To emphasize a three-dimensional effect, the circular graphics displayed on the liquid crystal panel are configured to display an image to which a highlight simulating a reflection of light is applied. However, the graphics may be displayed as if the inner regions thereof are filled with a displayed color.

The display portions 54 to 58 of the display apparatus main unit 50 receive an indication value from the display control portion 51 of the control apparatus 22, and perform a display in accordance with the indication value. Of the display portions 54 to 58 of the display apparatus main unit 50, only the energy consumption display portion 55 is related to this invention. Therefore, only what is related to the energy consumption display portion 55 will be described in detail below, and description of what is related to the other display portions 54, 56 to 58 will be omitted.

On receiving a detected value by the current sensor 35 (a detected value for the present generated current of the fuel cell 13), the display control portion 51 of control apparatus 22 outputs an indication value corresponding to the detected value to the energy consumption display portion 55 of the display apparatus main unit 50. The energy consumption display portion 55 displays a circular graphic (first graphic) with a size and a color that are in accordance with the indication value received from the display control portion 51. In a basic control when the fuel cell 13 is in operation, the size of the graphic displayed on the energy consumption display portion 55 increases substantially proportionally to the indication value. Furthermore, the color of the graphic continuously changes to that with a longer wavelength with an increase in the indication value (for example, blue→yellow→orange).

Figure 4:
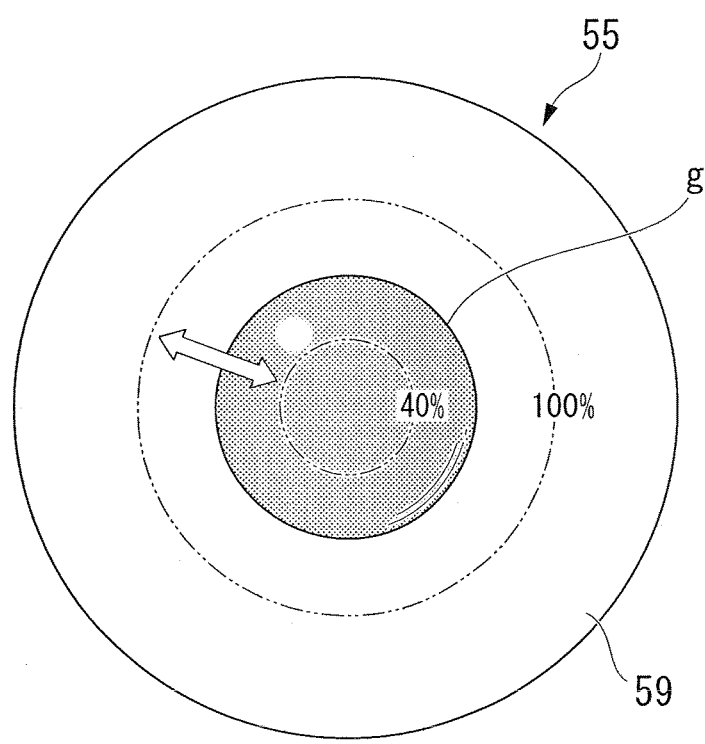
FIG. 4 is a diagram schematically showing a display by the vehicular display apparatus of the embodiment.

FIG. 4 displays the sizes of a displayed graphic g in the case of 100% and 40% in double-dotted circular lines, where 100% signifies when the detected value (the generated current IF) by the current sensor 35 with the fuel cell 13 in operation is maximum, and 40% signifies when the detected value (the generated current IF) is zero. The energy consumption display portion 55 displays a circular graphic with a size between the double-dotted circle at 100% and the double-dotted circle at 40% of the figure in accordance with the detected value by the current sensor 35. The circular graphic at this time is displayed in a color with a wavelength between those representing blue and orange (red being excluded because it is the same color as that of the warning lamp) in accordance with the detected value by the current sensor 35.

Figure 5:
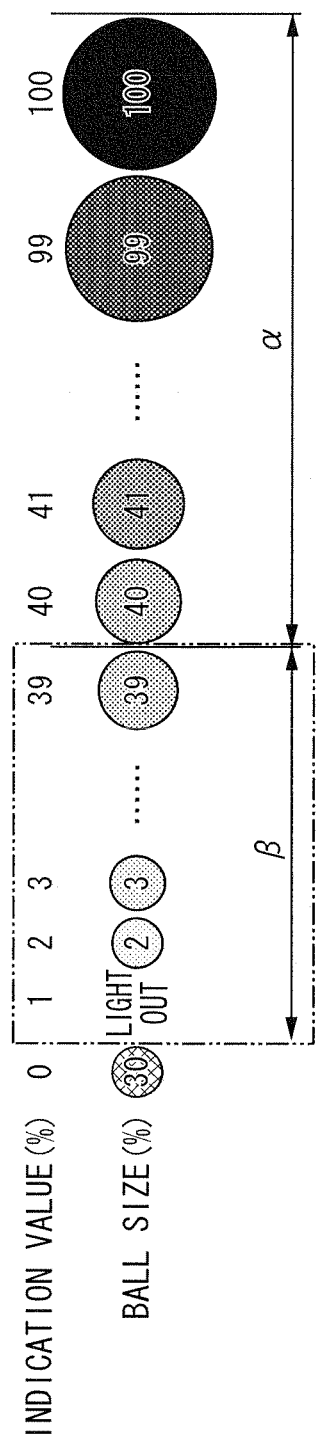
FIG. 5 is a diagram schematically showing a display by the vehicular display apparatus of the embodiment.

In the case of this embodiment, as shown in FIG. 5, the display control portion 51 outputs values from, for example, 40 to 100 as indication values in accordance with the detected value (the generated current IF) by the current sensor 35 when the fuel cell 13 is in operation (the range denoted with a in FIG. 5), and outputs 0 as an indication value when the idle stop (idle reduction) mode is active. However, when the fuel cell 13 is shifted from the operational state to the idle stop mode (hereinafter, referred to as "in shifting to the idle stop mode"), the display control portion 51 sequentially outputs values from 39 to 1 as indication values during a predetermined time (the range denoted with β in FIG. 5).

The state where the consumption amount of hydrogen (the generated current IF) is zero is divided into two types: (1) and (2) as follows. Of these, the state of the idle stop mode refers to the state of (1).

(1) The state where the operation of an air pump (air supply apparatus 18) for supplying oxygen to a fuel cell stack is stopped, and hence the operation of the stack is stopped.

(2) The state where supply of fuel (hydrogen) to the fuel cell stack is stopped although the air pump is in operation. Such operation is performed so as to consume battery by operating (idling) only the air pump (so as to prevent the state of charge (SOC) from exceeding its upper limit value) when the state of charge (SOC) of the battery (storage apparatus 11) is about to exceed its upper limit value.

As shown in FIG. 5, if an indication value 0 is output when the idle stop mode is active, the energy consumption display portion 55 displays a circular graphic (second graphic) in size of 30% of that of the maximum circular graphic (smaller than the minimum circular graphic when the fuel cell 13 is generating electric power), and also in dedicated color which is not used when the fuel cell 13 is in operation. As for the dedicated color, for example it is determined that green not be used when the fuel cell 13 is in operation, and green is displayed only when the indication value is 0. When the consumption amount of hydrogen is zero except when the idle stop mode is active, that is, at the time when the above (2) applies (hereinafter, the time is referred to as "when the air pump is in single operation"), a blue circular graphic with a size of 40% is displayed. The blue circular graphic with a size of 40% is displayed not only when the detected value (the generated current) is completely zero, but also when it is not more than a predetermined value in the vicinity of zero.

When the indication values from 39 to 1 are successively output by the display control portion 51 in shifting to the idle stop mode, the circular graphic is displayed so as to be gradually smaller from its minimum size (the size of 40%) when the fuel cell 13 is in operation (the range denoted with in FIG. 5). However, when the indication value is 1, the graphic is not displayed. As a result, in shifting to the idle stop mode, a fade-out effect can be obtained. In this example, the displayed color does not change in shifting to the idle stop mode.

Figure 6:
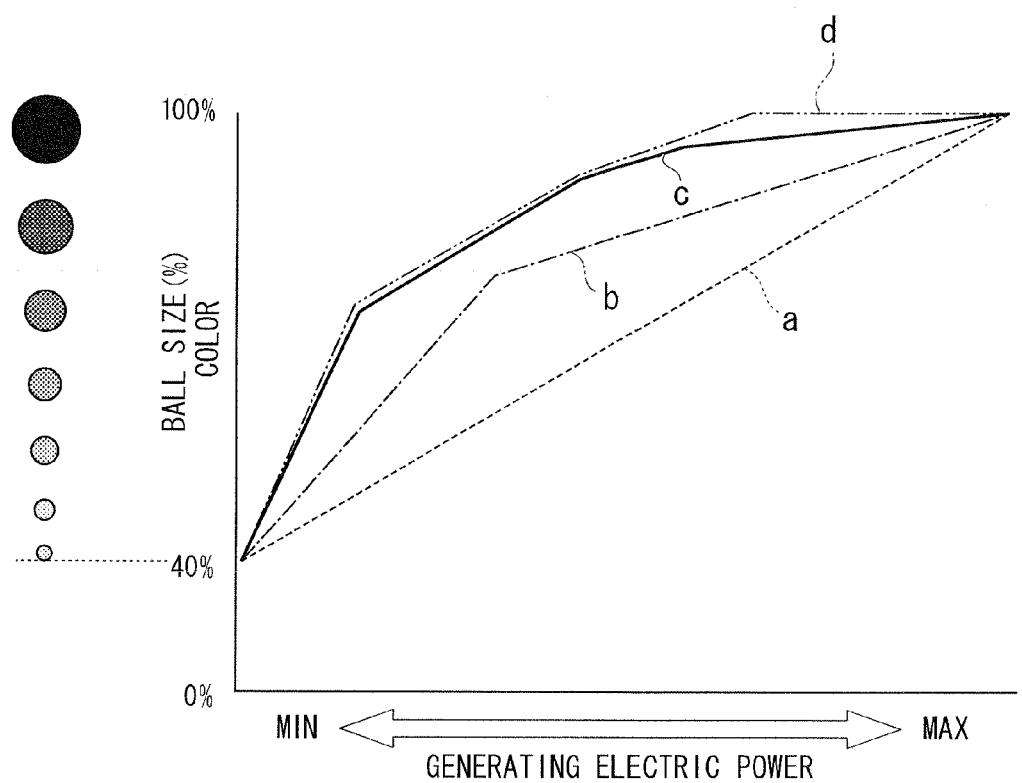
FIG. 6 is a conversion map between detected values of generated current and display indication values in the embodiment.

FIG. 6 shows four exemplary types of conversion mapping between the detected values of the generated current IF and the indication values used for the display control portion 51. A characteristic line a in FIG. 6 is for the case where the ratio of the increase in the indication value to the increase in the detected value (the generated current) by the current sensor 35 is always constant. Characteristic lines b to d in FIG. 6 are for the cases where the ratio of the increase in the indication value to the increase in the detected value by the current sensor 35 decreases stepwise. Of these, the characteristic line b is for the case where the ratio of the increase changes in one step. The characteristic line c is for the case where the increase changes in three steps. The characteristic line d is for the case where the ratio of the increase changes in three steps and the maximum indication value is output after a certain detected value is exceeded.

In the case where the mapping denoted with the characteristic line a is used, the ratio of the change in size and color wavelength of the displayed graphic to the corresponding change in increase and decrease of the detected value of the generated current IF is always constant. On the other hand, in the case where the mappings denoted with the characteristic lines b to d are used, the ratio of the change in size and color wavelength of the displayed graphic to the corresponding change in increase and decrease of the detected value of the generated current IF is milder as the detected value increases. Therefore, in the case where the mappings denoted with the characteristic lines b to d, especially the maps denoted with the characteristic lines c, d are used, the displayed graphic in a commonly used operational region changes sensitively. The displayed graphic changes more mildly in less used regions. Furthermore, in the case of the mapping denoted with the characteristic line d, the displayed graphic is displayed in size and color at its maximum level after a certain detected value is exceeded. This makes it possible to give a strong warning to the driver.

Figure 7:
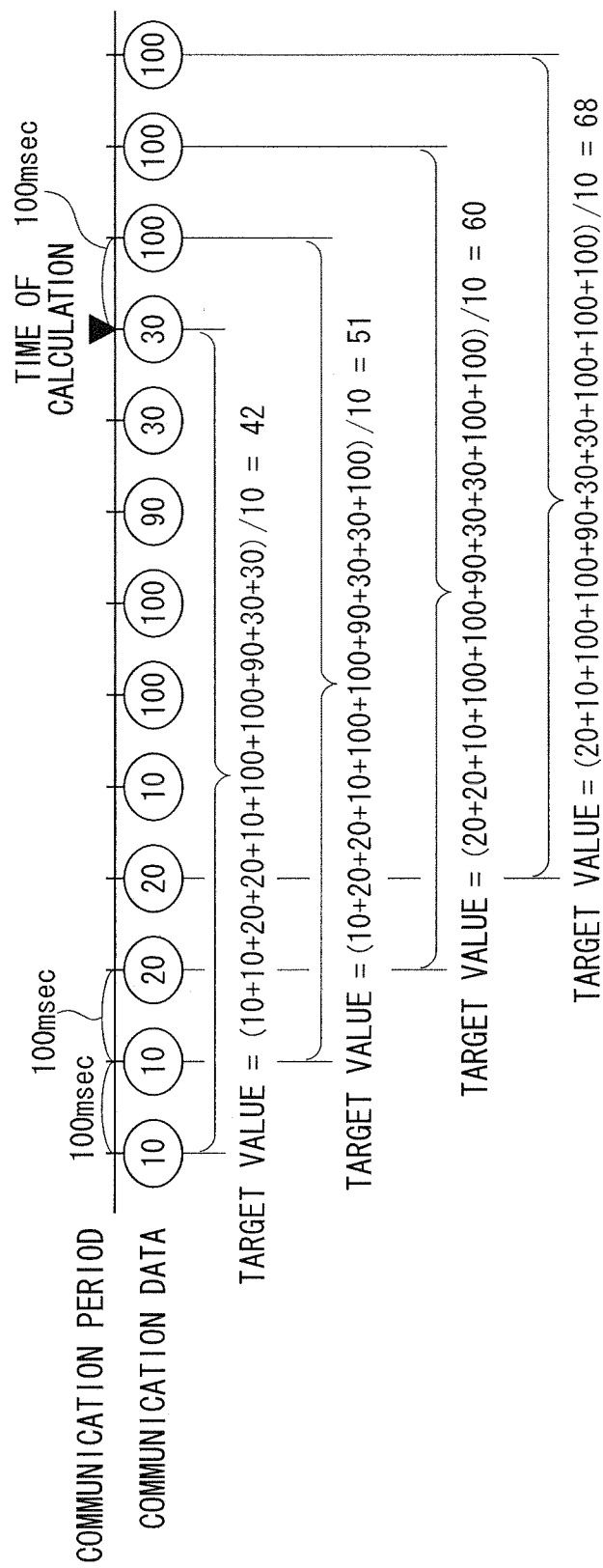
FIG. 7 is a diagram schematically showing a display control by the vehicular display apparatus of the embodiment.

FIG. 7 schematically shows timing to output indication values from the display control portion 51 to the energy consumption display portion 55 (the display apparatus main unit 50), and correction processing of the indication values. Here, an example where an indication value is output every 0.1 second is shown. The display control portion 51 does not output an indication value that corresponds to the detected value at the present moment, as it is, every 0.1 second. But the display control portion 51 calculates an average value (a moving average value) that corresponds to the detected values at the present moment and the nine most recent past points, and outputs the moving average value as a correction indication value to the energy consumption display portion 55 every 0.1 second.

Figure 8:
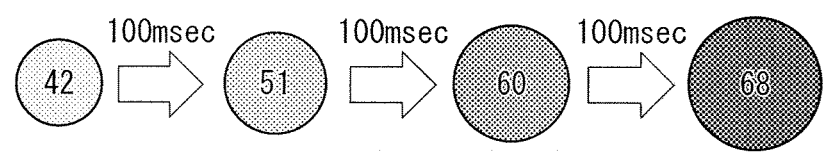
FIG. 8 is a diagram schematically showing a display control by the vehicular display apparatus of the embodiment.

FIG. 8 schematically shows how an indication value is corrected and output to the energy consumption display portion 55 every 0.1 second, in correspondence to the exemplary calculation of FIG. 7.

This processing that uses a moving average value for an indication value is one example of delay processing. As other delaying processing, for example, a primary processing filter can be used.

In the aforementioned configuration, when the fuel cell vehicle 10 is put to use, the energy consumption display portion 55 at the center of the display console 53 of the vehicular display apparatus 1 displays a circular graphic (lights up in a circle) in accordance with an operational state of the vehicle. The displayed graphic on the energy consumption display portion 55 at this time has a size and a color in accordance with the present generated current IF of the fuel cell 13.

Accordingly, for example, when the driver steps deeply on an accelerator pedal on a flat road, an uphill, or the like, the generated current IF of the fuel cell 13 increases in accordance with the load at that time. Then, the circular form of the energy consumption display portion 55 on the display console 53 increases in size, and at the same time, its displayed color changes continuously from a color of a short wavelength to a color of a long wavelength. If the accelerator pedal is released from this state, the generated current IF of the fuel cell 13 decreases with the decrease in load. Then, the circular form of the energy consumption display portion 55 decreases in size, and at the same time, its displayed color changes continuously from a color of long wavelength to a color of short wavelength.

The circular graphic displayed on the energy consumption display portion 55 is visually recognized as a spheral cubic graphic through the substantially hemispheric lens 59. Especially, a plurality of grooves 60 are formed in the surface of the lens 59. Therefore, even if the lens 59 is not allowed to have a sufficiently large curvature, the lens 59 can have a three-dimensional effect on the driver. Furthermore, with the cross-section of the grooves 60 being shaped in a wedge, the grooves 60 can be further emphasized by the reflection of the light from the light source that has been incident through the liquid crystal.

In a state of idle stop, the indication value for idle stop (in the example of FIG. 5, the indication value "0") is output from the display control portion 51 to the energy consumption display portion 55. As a result, the energy consumption display portion 55 displays a circular graphic (second graphic) that is different from the graphic (first graphic) displayed when the fuel cell 13 is in normal operation and when the air pump is in single operation, for example a green circular graphic with a size of 30%. If the generated current IF is zero and the air pump is operated singularly, the drive sound of the air pump continues similarly to when the fuel cell 13 is in normal operation. Therefore, the driver will have no feeling of discomfort if the size and color of the displayed circular graphic is not changed unlike the case described above.

Figure 9:
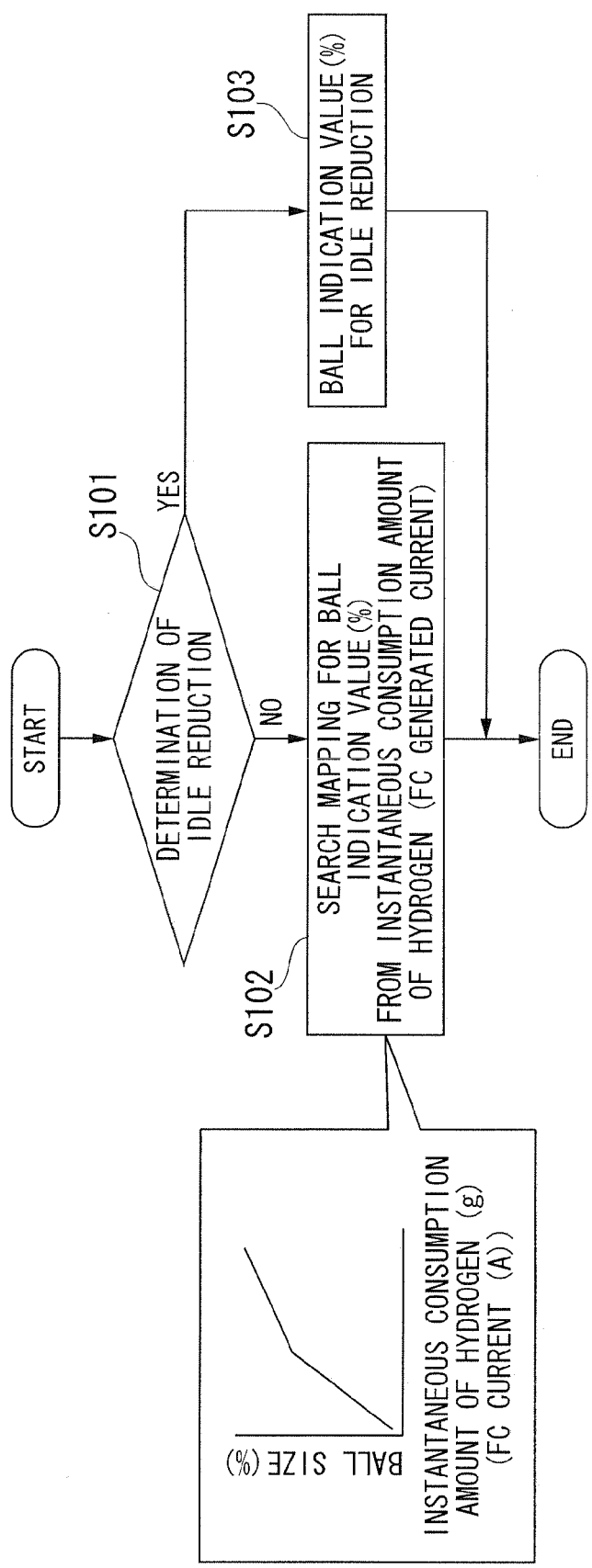
FIG. 9 is a flow chart showing a display control by the vehicular display apparatus of the embodiment.

Thus, when the idle stop mode is active, it is necessary to output indication values different from those when the fuel cell 13 is in operation or when the air pump is in single operation. Therefore, in the display control portion 51, a procedure as shown in FIG. 9 is performed.

The procedure shown in FIG. 9 will be described. First, in step S101, it is determined whether the idle stop mode is active or not from the present vehicle speed, the present shift position, and the like. If the idle stop mode is not active, processing in step S102 is performed. If the idle stop mode is active, processing in step S103 is performed.

In step S102, indication values that correspond to generated currents IF are obtained with reference to the mapping shown in FIG. 6. Furthermore, a moving average value is obtained in a manner as described above, and the value is output to the energy consumption display portion 55.

On the other hand, in step S103, the aforementioned indication value for the idle stop is output to the energy consumption display portion 55.

In addition, although not shown in the flow chart of FIG. 9, when the fuel cell 13 is shifted from the operational state to the idle stop, for example, when the idle stop is activated in the deceleration of the vehicle, the display control portion 51 outputs indication values dedicated to shifting (outputs the indication values from "39" to "1" sequentially in a predetermined period of time, in the example of FIG. 5) to the energy consumption display portion 55, to thereby bestow the aforementioned fade-out effect to the indication on the energy consumption display portion 55.

The vehicular display apparatus 1 displays the circular graphic that is displayed on the energy consumption display portion 55 while changing its size and color in accordance with the generated current of the fuel cell 13. This allows the driver to instantaneously grasp the present, instantaneous consumption amount of energy in an intuitively manner. Therefore, because the driver need not gaze at the displayed graphic itself on the display console 53, the driver can learn about the information on the instantaneous consumption amount of energy while keeping his or her line of sight in the forward direction. Consequently, it is possible to encourage the driver to be conscious of energy-saving driving.

Especially, in the vehicular display apparatus 1, the instantaneous consumption amount of energy is captured through the generated current IF of the fuel cell 13, and the displayed graphic is changed in size and color in accordance with the detected value of the generated current IF. Therefore, of the consumption amount of energy, only a consumption portion of energy that is likely to be affected by driver operation (a portion of the energy consumed by the traveling of the vehicle, the drive of an air conditioner, and the like) exclusive of the consumption of hydrogen by the purge processing or the like of the fuel cell 13 is allowed to be notified to the driver as a change in the displayed graphic. Therefore, the displayed graphic is not changed at the time of the purge processing, and the like. This will not offer a feeling of discomfort to the driver.

Furthermore, as shown by the characteristic lines b to d of FIG. 6, if the outputs of the indication values are controlled so that the ratio of the change in the indication value to the change in increase/decrease of the detected value is milder as the detected value of the generated current IF is greater, the displayed graphic can be changed sensitively (with high sensitivity) to the change in the instantaneous consumption of energy in the commonly used region. On the other hand, away from the commonly used region, in regions that are used less frequently it is possible to eliminate too sensitive a change in graphic. Therefore, it is possible to further encourage the driver to be conscious of energy-saving driving in the commonly used region.

In the case of the vehicular display apparatus 1 of this embodiment, during the predetermined time, a moving average value of the indication values that correspond to the detected values of the generated currents IF is obtained, and the moving average value is output to the energy consumption display portion 55 as a correction indication value. Therefore, it is possible to eliminate too sensitive a change in the displayed graphic (flickering in visual recognition due to modification in form and color) due to an instantaneous increase/decrease in the detected value of the generated current IF.

In this embodiment, in the case of the idle stop, a graphic (second graphic) is displayed which is different in size and color from the graphic (first graphic) displayed when the fuel cell 13 is in operation. This allows the driver to visually recognize clearly the state where the fuel cell 13 is in operation and the state where the idle stop mode is active. Therefore, even in a silent state when the idle stop is active, it is possible to notify the driver that the vehicle is in a driving condition.

Furthermore, in this embodiment, if the detected value is not more than a predetermined value in the vicinity of zero, a predetermined circular graphic is displayed instead of displaying no graphic. Therefore, when the detected value is temporarily lowered or other times in deceleration of the vehicle, discontinuity of display is avoided, making it possible to prevent the driver from feeling discomfort.

This invention is not limited to the above embodiment, and various design modifications can be made insofar as they do not depart from the spirit or scope of this invention. For example, in the above embodiment, the displayed graphic of the energy consumption display portion 55 are changed in size (area) and color in accordance with the present, instantaneous consumption amount of energy. However the displayed graphic may be changed only in one of size (area) and color.

Furthermore, the displayed graphic is not limited in shape to a circle. The graphic may have another shape such as a rectangle or a triangle.

Furthermore, in the above embodiment, the instantaneous consumption amount of energy is detected based on the generated current IF of the fuel cell 13. However, it may be configured such that the consumption of a hydrogen gas is directly detected. In addition, the vehicle to which this invention is applied is not limited to a fuel cell vehicle, but also to a type of vehicle in which a gasoline, a natural gas, or the like is combusted in an internal combustion engine.

INDUSTRIAL APPLICABILITY

According to the vehicular display apparatus of the present invention, a change in at least one of the displayed size and the displayed color of the graphic which is displayed on the display portion allows the driver to instantaneously grasp the present consumption amount of energy in an intuitive mariner. This makes it possible to encourage the driver to be conscious of energy-saving driving.

The invention claimed is:

1. A vehicular display apparatus comprising a display portion that displays a predetermined graphic in accordance with a present consumption amount of energy used for moving a vehicle, wherein
the graphic displayed on the display portion changes at least one of a displayed size and a displayed color thereof in accordance with the consumption amount,
the displayed size increases as the consumption amount increases,
the displayed color is changed to have a longer wavelength as the consumption amount increases, and
the vehicular display apparatus further comprising a display control portion that determines an indication value within a defined range in accordance with a detected value of the consumption amount and displays the indication value on the display portion, so that a ratio of a change in the indication value with respect to a change in the detected value is configured to decrease as the detected value of the consumption amount increases,
wherein the display portion displays a first graphic for indicating a zero energy consumption of the vehicle and a second graphic for indicating an idle stop state of the vehicle, the first graphic successively decreasing in size in connection with a defined range of integers and changing to the second graphic when the vehicle is shifted to the idle stop state.

2. The vehicular display apparatus according to claim 1, wherein the indication value results from delay processing being performed on the detected value.

3. The vehicular display apparatus according to claim 1, wherein, when the consumption amount is no more than a predetermined value in a vicinity of zero, the first graphic has a predetermined size in which the displayed size is not zero.

4. The vehicular display apparatus according to claim 1, wherein the second graphic has a size and a color which are different from those of the first graphic.

5. The vehicular display apparatus according to claim 1, wherein
the graphic is circular, and
a substantially hemispheric lens that transmits light for forming the graphic is arranged in the display portion.

6. The vehicular display apparatus according to claim 5, wherein
lattice-shaped grooves are provided in a surface of the substantially hemispheric lens.

7. The vehicular display apparatus according to claim 1, wherein the vehicle uses, as a drive electric power source, a fuel cell that consumes hydrogen as the energy to generate electric power, and the consumption amount of the energy is obtained based on a generated current of the fuel cell.

8. The vehicular display apparatus according to claim 7, wherein a portion of the defined range includes a set of integers with the smallest integer corresponding to zero generated current, and the greatest integer corresponding to a maximum generated current of the fuel cell.

* * * * *